United States Patent
Clemm et al.

(10) Patent No.: US 10,530,659 B2
(45) Date of Patent: Jan. 7, 2020

(54) IDENTIFIER-BASED RESOLUTION OF IDENTITIES

(71) Applicant: Futurewei Technologies, Inc., Plano, TX (US)

(72) Inventors: Alexander Clemm, Los Gatos, CA (US); Uma S. Chunduri, Fremont, CA (US); Padmadevi Pillay-Esnault, San Jose, CA (US); Yingzhen Qu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/924,919

(22) Filed: Mar. 19, 2018

(65) Prior Publication Data

US 2019/0007275 A1    Jan. 3, 2019

Related U.S. Application Data

(60) Provisional application No. 62/527,888, filed on Jun. 30, 2017.

(51) Int. Cl.
*H04L 12/24* (2006.01)
*H04L 29/12* (2006.01)
(Continued)

(52) U.S. Cl.
CPC .......... *H04L 41/12* (2013.01); *G06F 21/6254* (2013.01); *H04L 61/103* (2013.01); *H04L 61/2084* (2013.01); *H04L 63/0421* (2013.01)

(58) Field of Classification Search
CPC ....... H04W 4/30; H04W 4/023; H04W 12/10; H04W 4/04; H04W 12/12; H04W 4/02;
(Continued)

(56) References Cited

U.S. PATENT DOCUMENTS 8,966,075 B1 * 2/2015 Chickering ......... H04L 12/4641
709/220
2012/0203856 A1 8/2012 Wu et al.
(Continued)

FOREIGN PATENT DOCUMENTS

CN  102045314 A  5/2011
CN  102075937 A  5/2011
(Continued)

OTHER PUBLICATIONS

Chunduri, et al., "Identity Use Cases in Ideas," draft-ccm-ideas-identity-use-cases-01, Jul. 3, 2017, 10 pages.
(Continued)

*Primary Examiner* — Dady Chery
(74) *Attorney, Agent, or Firm* — Conley Rose, P.C.

(57) ABSTRACT

An apparatus in an IP network, the apparatus comprises: a receiver configured to: obtain an identity of a first entity, the identity is a unique identification of the first entity at a given time, obtain a first identifier of the identity, and obtain a second identifier of the identity, the first identifier and the second identifier are identifications of the identity; and a processor coupled to the receiver and configured to: create an association of the first identifier and the second identifier with the identity, and instruct storage of the association in a database.

18 Claims, 8 Drawing Sheets

(51) Int. Cl.
*H04L 29/06* (2006.01)
*G06F 21/62* (2013.01)

(58) Field of Classification Search
CPC .. H04W 84/12; H04W 12/06; H04L 61/6022; H04L 41/12
See application file for complete search history.

(56) References Cited

U.S. PATENT DOCUMENTS

| | | | | |
|---|---|---|---|---|
| 2012/0320815 | A1* | 12/2012 | Massena | H04W 4/02 370/313 |
| 2013/0124630 | A1* | 5/2013 | Reunamaki | H04L 29/1232 709/204 |
| 2014/0162601 | A1 | 6/2014 | Kim et al. | |
| 2015/0024782 | A1* | 1/2015 | Edge | H04W 4/04 455/456.3 |
| 2016/0182497 | A1 | 6/2016 | Smith | |
| 2017/0054692 | A1 | 2/2017 | Weis | |
| 2017/0316106 | A1 | 11/2017 | Pillay-Esnault | |
| 2018/0139133 | A1 | 5/2018 | Makhijani et al. | |
| 2018/0227301 | A1* | 8/2018 | Maruyama | H04L 63/08 |
| 2018/0253738 | A1* | 9/2018 | Benson | G07B 17/00508 |
| 2019/0007307 | A1 | 1/2019 | Chunduri et al. | |

FOREIGN PATENT DOCUMENTS

| | | |
|---|---|---|
| CN | 104823471 A | 8/2015 |
| EP | 1492306 A2 | 12/2004 |

OTHER PUBLICATIONS

Clemm, et al., "Originator-Based Network Restraint System for Identity-Oriented Networks, ", U.S. Appl. No. 15/639,976, filed Jun. 30, 2017, 36 pages.
Farinacci, et aL., "The Locator/ID Separation Protocol (LISP)," RFC 6830, Jan. 2013, 75 pages.
Moskowitz, et al., "Host Identity Protocol Version 2 (HIPv2)," RFC 7401, Apr. 2015, 128 pages.
Pillay-Esnault, et al., "Identifier-Based Firewalls in Identity-Oriented Networks," U.S. Appl. No. 62/511,579, filed May 26, 2017, 14 pages.
Postel, "Darpa Internet Program Protocol Specification," Information Sciences Institute, RFC 791, Sep. 1981, 50 pages.
Farinacci, D., et al., "LISP EID Anonymity," XP015112981, draft-farinacci-lisp-eid-anonymity-00, May 6, 2016, 8 pages.
Rui, T., et al., "Network Access Control Mechanism based on Locator/Identifier Split," XP031505400, IEEE International Conference on Networking, Architecture, and Storage, 2009, pp. 171-174.
Yan, Z., et al., "A Novel Mobility Management Mechanism Based on an Efficient Locator/ID Separation Scheme," XP031570381, First International Conference on Future Information Networks, 2009, 6 pages.
Orava, P., et al., "Temporary MAC Addresses for Anonymity," XP040383750, IEEE P802.11, Wireless LANs, Jun. 2002, 17 pages.
Farinacci, et al., "LISP EID Anonymity," draft-farinacci-lisp-eid-anonymity-01, Oct. 31, 2016, 8 pages.
Pillay-Esnault, Ed., et al., "Problem Statement for Identity Enabled Networks," draft-padma-ideas-problem-statement-01, Mar. 12, 2017, 15 pages.
Pillay-Esnault, Ed., et al., "Requirements for Generic Resilient Identity Services in Identity Enabled Networks," draft-padma-ideas-req-grids-00, Mar. 13, 2017, 15 pages.
Herbert, T., et al., "Identifier-locator addressing for IPv6," draft-herbert-nvo3-ila-04, Mar. 13, 2017, 39 pages.
Kompella, K., et al., "Link Bundling in MPLS Traffic Engineering (TE)," RFC 4201, Oct. 2005, 12 pages.
Raza, K., et al., "Controlling State Advertisements of Non-negotiated LDP Applications," RFC 7473, Mar. 2015, 15 pages.
Farinacci, D., et al., "LISP EID Anonymity," draft-farinacci-lisp-eid-anonymity-02, Apr. 12, 2017, 9 pages.
Machine Translation and Abstract of Chinese Publication No. CN102075937, May 25, 2011, 11 pages.
Foreign Communication From a Counterpart Application, PCT Application No. PCT/CN2017/081216, International Search Report dated Jun. 30, 2017, 4 pages.
Foreign Communication From a Counterpart Application, European Application No. 17788703.1, Extended European Search Report dated Feb. 22, 2019, 9 pages.
Office Action dated May 25, 2018, 19 pages, U.S. Appl. No. 15/491,828, filed Apr. 19, 2017.

* cited by examiner

300

Table 1
305

| Identity 310 | Policies 1-*a* 315 | Metadata 1-*b* 320 |

Table 2
325

| Identifier 330 | Policies 1-*c* 335 | Metadata 1-*d* 340 | Locations 1-*e* 345 |

Table 3
350

| Identity 355 | Identifiers 1-*f* 360 |

IDENTIFIER-BASED RESOLUTION OF IDENTITIES

CROSS-REFERENCE TO RELATED APPLICATIONS

This application claims priority to U.S. provisional patent application No. 62/527,888 filed on Jun. 30, 2017 by Futurewei Technologies, Inc. and titled "Identifier-Based Resolution of Identities," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Connectivity among entities such as users and their devices is becoming ubiquitous. In traditional IP networks, it may be difficult to maintain connectivity between mobile entities while having optimal routing paths and low latencies. IP networks, IONs, IENs, ID-LOC networks, and other networks attempt to address that issue in various ways.

SUMMARY

In one embodiment, the disclosure includes an apparatus in an IP network, the apparatus comprising: a receiver configured to: obtain an identity of a first entity, obtain a first identifier of the identity, and obtain a second identifier of the identity; and a processor coupled to the receiver and configured to: create an association of the first identifier and the second identifier with the identity, and instruct storage of the association in a database. In some embodiments, the identity is a unique identification of the first entity at a given time; the first identifier and the second identifier are identifications of the identity; the first identifier and the second identifier are any combination of IP addresses, cryptographic hashes of IP addresses, LISP EIDs, or HIP HITs; the first identifier is a publicly known designated identifier, and wherein the second identifier is an ephemeral identifier used for anonymity or obfuscation of the identity; the apparatus is a service node; the receiver is further configured to receive a first message from a second entity, and wherein the first message comprises the first identifier and requests data associated with the identity; in response to the first message, the processor is further configured to: access the database to determine that the identity is associated with the first identifier; retrieve the data when a policy permits provision of the data to the second entity; and generate a second message comprising the data; the apparatus further comprises a transmitter coupled to the processor and configured to transmit the second message to the second entity.

In another embodiment, the disclosure includes a method implemented in an IP network, the method comprising: obtaining an identity of a first entity; obtaining a first identifier of the identity; obtaining a second identifier of the identity; creating an association of the first identifier and the second identifier with the identity; and instructing storage of the association in a database. In some embodiments, the identity is a unique identification of the first entity at a given time; the first identifier and the second identifier are any combination of IP addresses, cryptographic hashes of IP addresses, LISP EIDs, or HIP HITs; the first identifier is a publicly known designated identifier, and wherein the second identifier is an ephemeral identifier used for anonymity or obfuscation of the identity; the method further comprises receiving a first message from a second entity, wherein the first message comprises the first identifier and requests data associated with the identity; the method further comprises accessing, in response to the first message, the database to determine that the identity is associated with the first identifier; retrieving the data when a policy permits provision of the data to the second entity; generating a second message comprising the data; and transmitting the second message to the second entity.

In yet another embodiment, the disclosure includes a first entity in an IP network, the first entity comprising: a processor configured to generate a first message comprising a first identifier and requesting data associated with an identity of the first identifier, the identity is a unique identification of a second entity at a given time, and the first identifier is an identification of the identity; a transmitter coupled to the processor and configured to transmit the first message to a service node; and a receiver coupled to the processor and configured to receive a second message from the service node an in response to the first message, the second message comprises the data when the data are associated with a second identifier that is also an identification of the identity. In some embodiments, the data are one of metadata, a policy, and a location; the data comprise all identifiers associated with the identity; the second message omits the data when a policy associated with the identity prohibits provision of the data to the first entity.

In yet another embodiment, the disclosure includes a method implemented by a first entity, the method comprising: registering a first identity with a service node; registering a first identifier with the service node; transmitting to the service node a first message requesting a location associated with a second entity, the second entity is associated with a policy; and receiving, when the first message comprises a second identifier of the first identity and when the policy indicates that the first identifier or the first identity may not receive the location, a third message indicating that the second identifier or the first identity may not receive the location. In some embodiments, the method further comprises receiving, when the first message comprises the first identifier and when the policy indicates that the first identifier may receive the location, a second message comprising the location.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
CPU: central processing unit
DSP: digital signal processor
EID: endpoint identifier
EO: electrical-to-optical
FPGA: field-programmable gate array
GPS: Global Positioning System
GQE: GRIDS quantum entanglement
GRIDS: generic identity and mapping services
HIP: Host Identity Protocol
HIT: host identity tag
ID: identifier
IEN: identity-enabled network
ION: identity-oriented network
IP: Internet Protocol
IPv4: Internet Protocol version 4
IPv6: Internet Protocol version 6
LISP: Locator/Identifier Separation Protocol
LOC: locator
OE: optical-to-electrical
OSS: operations support system
PKIX: Public-Key Infrastructure
RAM: random-access memory
RF: radio frequency
RFC: request for comments
ROM: read-only memory
RX: receiver unit
SIM: subscriber identity module
SRAM: static RAM
TCAM: ternary content-addressable memory
TX: transmitter unit.

Figure 1:
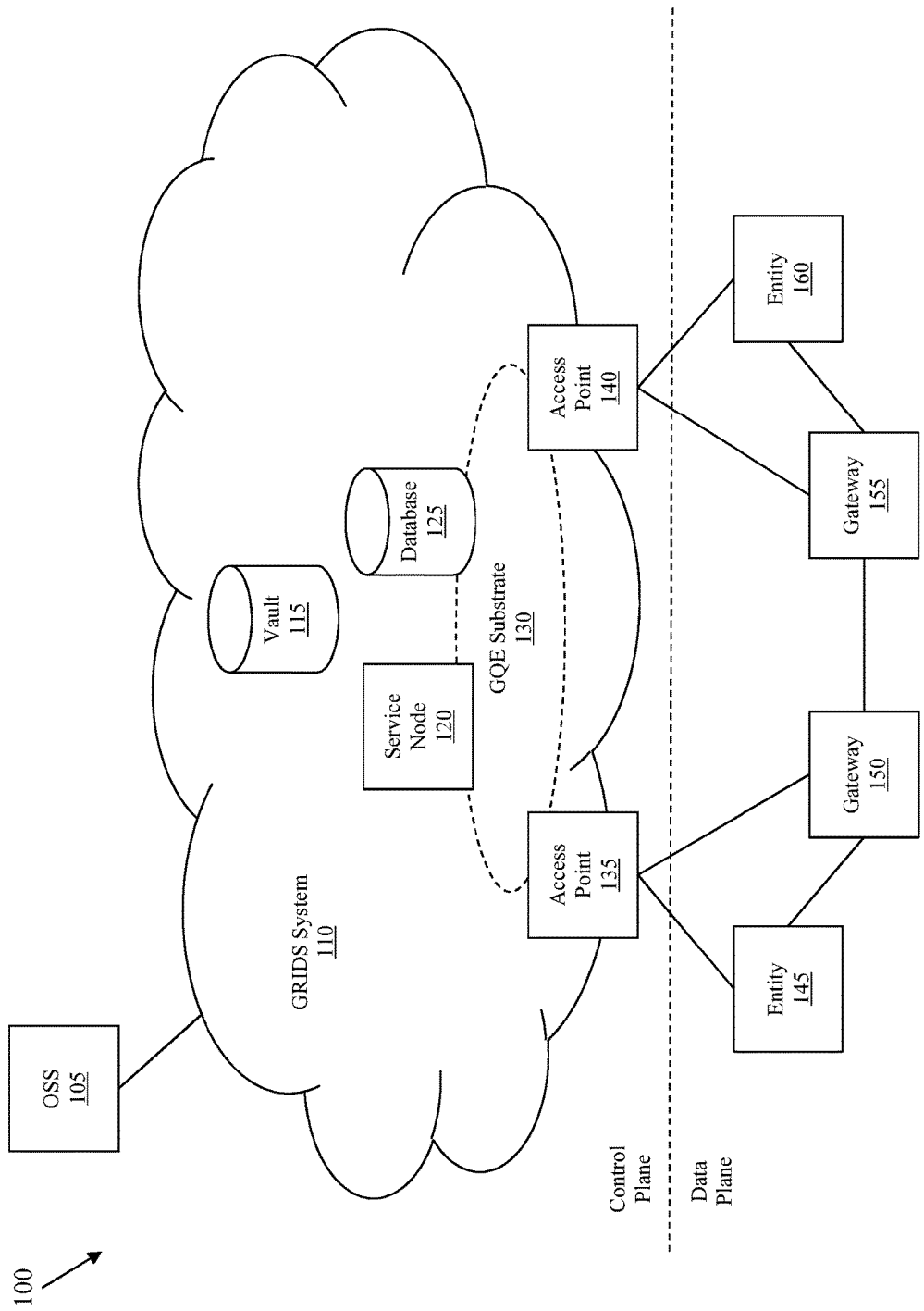
FIG. 1 is a schematic diagram of a network.

FIG. 1 is a schematic diagram of a network 100. The network 100 is an IP network, ION, IEN, ID-LOC network, or other network. ION networks are described in U. Chunduri, et al., Identity Use Cases in IDEAS, Jul. 3, 2017, which is incorporated by reference. The network 100 comprises an OSS 105; a GRIDS system 110; entities 145, 160; and gateways 150, 155. The OSS 105 and the GRIDS system 110 reside in a control plane, and the entities 145, 160 and the gateways 150, 155 reside in a data plane. The components of the network 100 may be referred to as nodes. Though the network 100 shows specific numbers of nodes, the network 100 may have any number of such nodes. Each of the nodes is a hardware computer or server, a group of hardware computers or servers, or a software function of a hardware computer or server.

The OSS 105 is a computer system or set of programs that an enterprise, a network provider, or a service provider such as Verizon, Orange, AT&T, or Sprint operates in order to provide network services such as traffic balancing and fault management. The GRIDS system 110 comprises a vault 115; a service node 120; a database 125; and access points 135, 140. The GRIDS system 110 implements GRIDS, which moves identification of the entities 145, 160 from IP, which uses addresses, and from LISP and HIP, which use identifiers and locators, to use of identities, identifiers, and locators. IP is described in Jon Postel, "Internet Protocol," RFC 791, September 1981, which is incorporated by reference; LISP is described in D. Farinacci, et al., "The Locator/ID Separation Protocol (LISP)," RFC 6830, January 2013, which is incorporated by reference; and HIP is described in R. Moskowitz, et al., "Host Identity Protocol Version 2 (HIPv2)," RFC 7401, April 2015, which is incorporated by reference. Alternatively, the GRIDS system 110 is another identity-identifier-locator mapping system. The vault 115 stores secure data such as sensitive information that the entities 145, 160 in particular and the nodes in the data plane in general may not access. The vault 115 may store its data in an encrypted manner. The service node 120 provides identity-identifier look-up, metadata, and other services to the entities 145, 160 using the database 125. The database 125 comprises locators, identifiers, and other data, as well as relationships among that data, as described further below. The database 125 may also store its data in an encrypted manner. The GQE substrate 130 provides control and interconnection of the service node 120; database 125; and access points 135, 140. The access points 135, 140 are communication interfaces for the entities 145, 160 and the gateways 150, 155 to access the GRIDS system 110. The GRIDS system 110 may comprise an access point for each entity. The service node 120 and the access points 135, 140 may or may not be co-located.

The entities 145, 160 are mobile phones, tablet computers, connected vehicles, traffic cameras, or other endpoint devices. The entities 145, 160 may be associated with proxies that act on behalf of the entities 145, 160. The gateways 150, 155 provide direct communication between the entities 145, 160. The gateways 150, 155 may also provide identity-identifier, look-up, metadata, caching, and other services to the entities 145, 160 using the service node 120 or the database 125. The network 100 may comprise a gateway for each entity.

The network 100 uses identities for the entities 145, 160. The identities are unique identifications of the entities 145, 160 at given times and do not change when the entities 145, 160 change locations. The nodes in the data plane may not communicate identities among themselves. For instance, the entity 145 may not know the identity of the entity 160, and the entity 160 may not know the identity of the entity 145. A node in the data plane and a node in the control plane may communicate an identity for authentication or other purposes. For instance, the service node 120 assigns identities to the entities 145, 160, then uses those identities to identify, authenticate, and authorize the entities 145, 160. Alternatively, the OSS 105 assigns the identities and provides those identities to the service node 120 or the entities 145, 160 register the identities. The identities may be PKIX certificates or IPv6 addresses.

The network 100 also uses identifiers for the entities 145, 160. The identifiers are identifications of the identities and use address namespaces different from the identities. The network 100 maintains connectivity among its nodes by disassociating the identifiers from IP addresses and by making forwarding decisions based on the identifiers. When the identifiers change, the identities may not change. There may be at least two categories of identifiers. A first category of identifier is publicly known, is used for location resolution, typically has a longer life, and may be referred to as a designated identifier or a long-lived identifier. Designated identifiers may include LISP EIDs and HIP HITs. A second category of identifier is used for anonymity or obfuscation of identities to nodes that should not know those identities, is used in packet headers, typically has a shorter life such as for a single session, is not publicly known, and may be referred to as an ephemeral identifier. The entities 145, 160 register identifiers with the service node 120, and the service node 120 makes associations of the identifiers with corresponding entities 145, 160 and instructs storage of the associations in the database 125. Alternatively, the service node 120 assigns identifiers to the entities 145, 160; the entities 145, 160 or the gateways 150, 155 request such assignment; or the gateways 150, 155 register identifiers with the service node 120 on behalf of the entities 145, 160. The identifiers may be IP addresses such as IPv4 addresses or IPv6 addresses, or the identifiers may be cryptographic hashes of those IP addresses. Both designated identifiers and ephemeral identifiers may share a same format. The nodes in the data plane may use the identifiers to designate senders and receivers of packets in packet headers.

When the entity 145 desires to communicate with the entity 160, first, the entities 145, 160 authenticate with the service node 120 using their identities, are assigned identifiers by or register identifiers with the service node 120, and provide current locations to the service node 120. Alternatively, authentication and identifier assignment occur beforehand. The service node 120 may publish the identifiers to other nodes in the network 100. Second, the entity 145 transmits to the access point 135 a first message comprising a first identifier of the entity 145, a second identifier of the entity 160, and a request for a location of the entity 160. The message may also be referred to as a plane packet, and the location may also be referred to as a locator. The access point 135 forwards the first message to the service node 120. The service node 120 uses the database 125 to authenticate the entity 145 using the first identifier and to determine the location of the entity 160 using the second identifier. The service node 120 transmits to the access point 135 a second message comprising the location of the entity 160. The access point 135 forwards the second message to the entity 145. Finally, using the location of the entity 160 from the second message, the entity 145 communicates with the entity 160 through the gateways 150, 155 and any other nodes between the gateways 150, 155. Though the service node 120 is described as authenticating, determining a location, and forwarding, other nodes may also do so.

The service node 120 assesses an identity by a given identifier, assesses whether two identifiers belong to the same identity, and resolves metadata or other information associated with an identity using an identifier. In addition, the service node 120 applies policies to target entities 145, 160 by identifying the target entities 145, 160. Thus, policy expressions refer to identifiers when the identifiers identify the target entities 145, 160. It is desirable for the service node 120 specifically and the network 100 generally to resolve identities of the entities 145, 160 using identifiers. Such resolution protects identities from revelation in the data plane and ensures provision of data when the entities 145, 160 change locations in the network 100.

Disclosed herein are embodiments for identifier-based resolution of identities. In this context, the word "resolution" and its derivatives mean obtaining identifiers, determining identities associated with the identifiers, and retrieving data associated with the identities. Determining identities comprises a look-up procedure or other procedure. The data are metadata, policies, locations, other identifiers, or other data. Resolution may also comprise obtaining identifiers and retrieving data associated with the identifiers. The resolution occurs even when entities change locations, addresses, or other identifying information, thus ensuring connectivity among entities at all desired times. In addition, the embodiments provide a foundation for identity-based firewalls, network restraint systems, or other applications. Furthermore, the embodiments provide for specification of all identifiers associated with an identity for management, lawful intercept, regulatory, or other purposes. Such identifiers may be in use or previously used.

Figure 2:
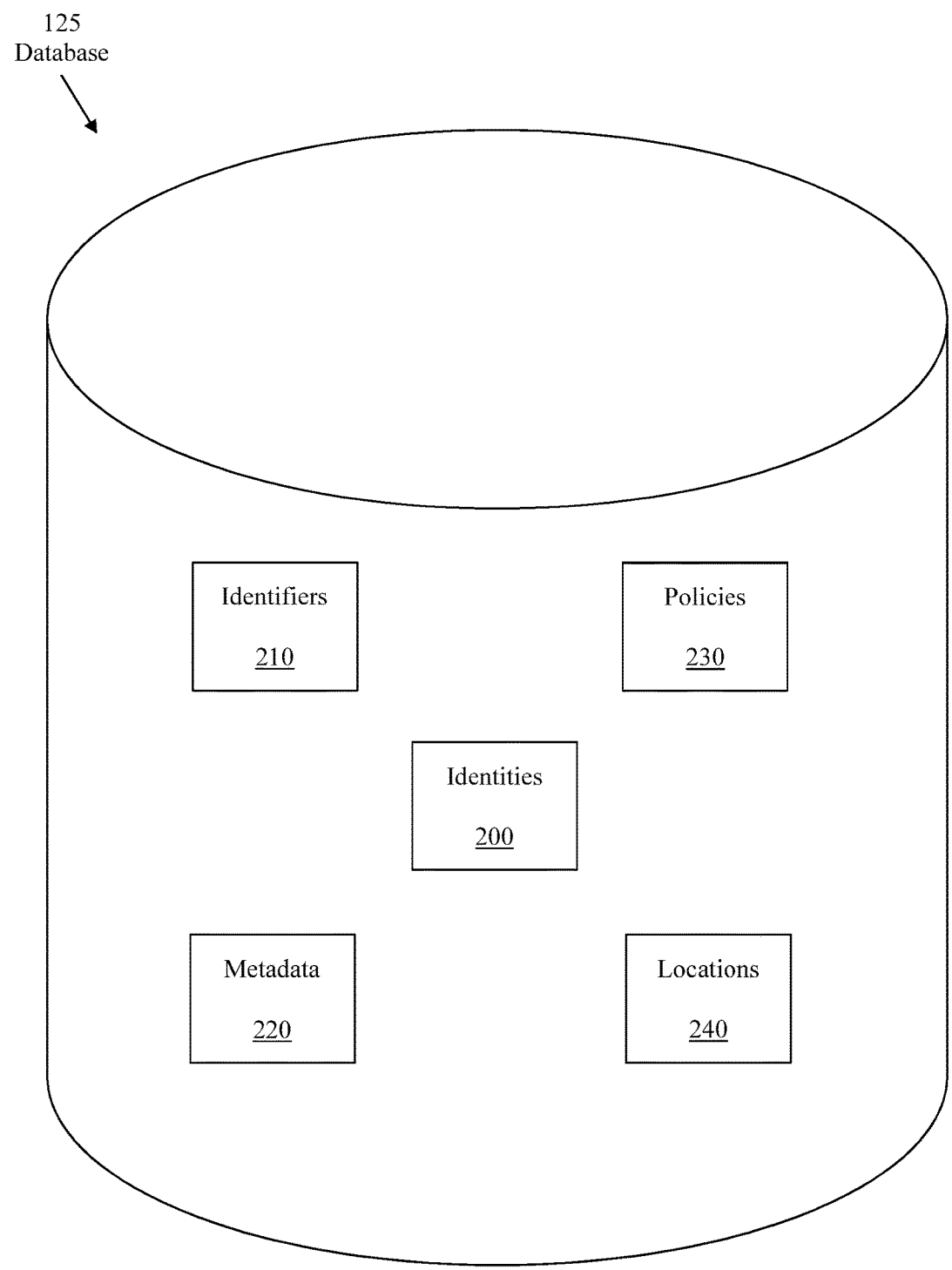
FIG. 2 is a schematic diagram of the database in FIG. 1 according to an embodiment of the disclosure.

FIG. 2 is a schematic diagram of the database 125 in FIG. 1 according to an embodiment of the disclosure. The database 125 comprises identities 200, identifiers 210, metadata 220, policies 230, and locations 240, as well as associations among those data. The database 125 may comprise additional data that are not shown. FIG. 2 illustrates the database in an abstracted manner to separate the identities 200, the identifiers 210, the metadata 220, the policies 230, and the locations 240.

Each of the identities 200 may be associated with multiple identifiers 210. However, each of the identifiers 210 is associated with only one of the identities 200 at a time. The metadata 220 represent data describing the entities 145, 160. For instance, the metadata 220 describe an access point 135, 140 of last registration; types of the entities 145, 160 such as mobile phones, tablet computers, connected vehicles, or traffic cameras; indications of whether the entities 145, 160 are or were policy offenders; lists of the identifiers 210 that the entities 145, 160 are interested in for purposes such as location updates; a subscription level or pay level of customers associated with the entities 145, 160; billing information of those customers; GPS data; device management information; authentication keys or certificates; tags; capabilities associated with the identities 200 or the identifiers 210; or other information. The policies 230 represent data describing how the entities 145, 160 may communicate with each other, what information about each other that the entities 145, 160 may access, or other information. For instance, the policies 230 describe access restrictions to the identifiers 210, the metadata 220, and the locations 240. The locations 240 represent data describing where the entities 145, 160 are located. For instance, the locations 240 describe networks or nodes within the networks. Various schemata for implementing the database 125 are described below, but any suitable schema may implement the database 125.

Figure 3:
FIG. 3 is a schematic diagram of a coarse-grained schema according to an embodiment of the disclosure.
Figure 3:
Figure 3:

FIG. 3 is a schematic diagram of a coarse-grained schema 300 according to an embodiment of the disclosure. The service node 120 maps and stores data in the database 125 according to the coarse-grained schema 300. The coarse-grained schema 300 implements storage of data in the database 125. The coarse-grained schema 300 comprises table 1 305, table 2 325, and table 3 350.

Table 1 305 comprises an identity 310, policies 1-*a* 315, and metadata 1-*b* 320. Table 2 325 comprises an identifier 330, policies 1-*c* 335, metadata 1-*d* 340, and locations 1-*e* 345. Table 3 350 comprises an identity 355 and identifiers 1-*f* 360. A, b, c, d, e, and f are any suitable integers and may be the same. The identities 310, 355 are from the identities 200; the policies 315, 335 are from the policies 230; the metadata 320, 340 are from the metadata 220; and the locations 345 are from the locations 240.

As can be seen, table 1 305 associates the policies 315 and the metadata 320 with a single identity 310; table 2 325 associates the policies 335, the metadata 340, and the locations 345 with a single identifier 330; and the table 3 350 associates the identifiers 360 with a single identity 355. The coarse-grained schema 300 uses set-valued entries, meaning entries with multiple values or sets of values. For instance, there are 1-*f* identifiers 360 in table 3 350, not just one identifier. Though the coarse-grained schema 300 shows specific numbers of data instances, the coarse-grained schema 300 may have any number of such data instances.

Figure 4:
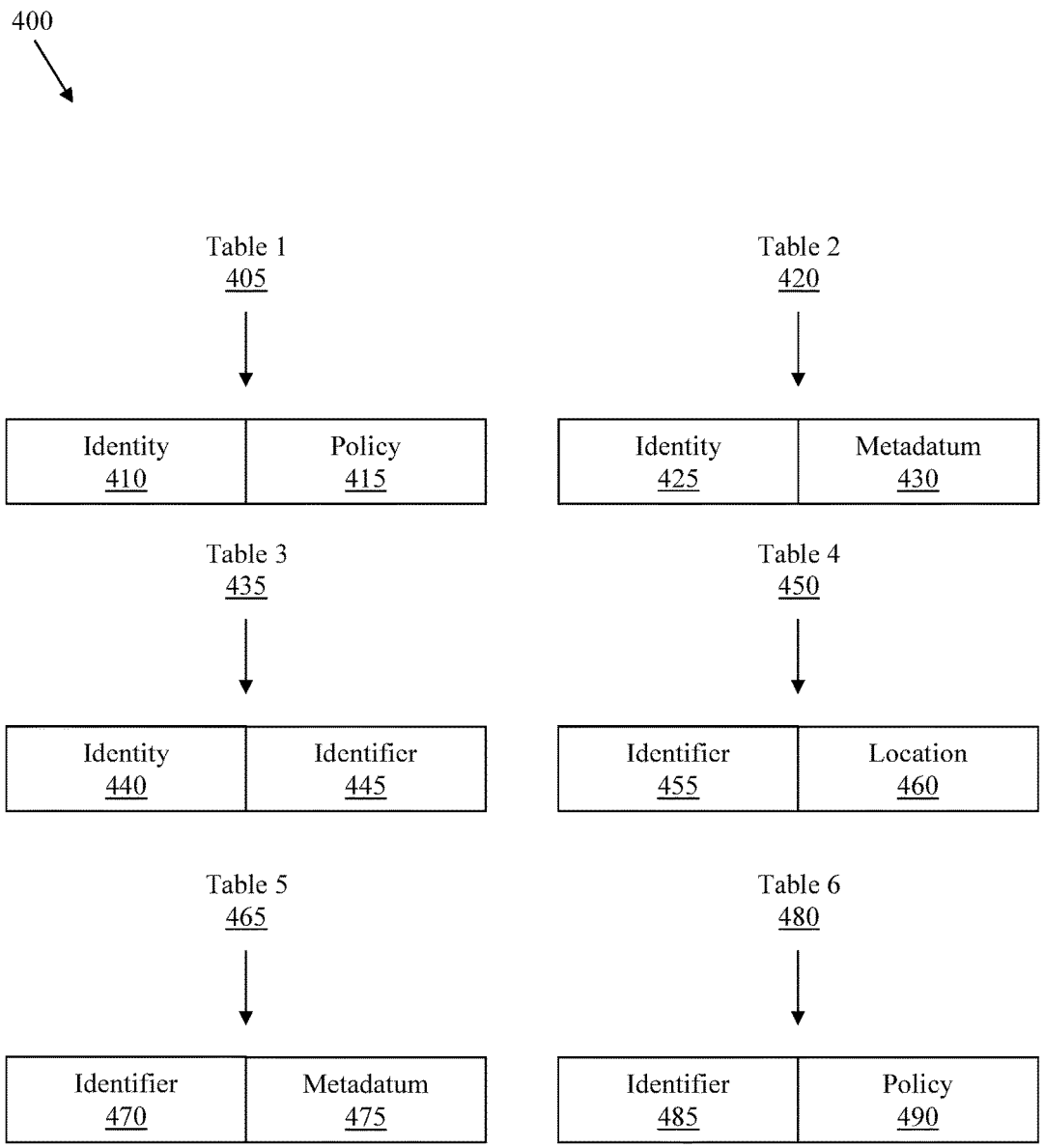
FIG. 4 is a schematic diagram of a fine-grained schema according to an embodiment of the disclosure.

FIG. 4 is a schematic diagram of a fine-grained schema 400 according to an embodiment of the disclosure. The service node 120 maps and stores data in the database 125 according to the fine-grained schema 400. The fine-grained schema 400 implements storage of data in the database 125 as an alternative to the coarse-grained schema 300 in FIG. 3. Unlike the coarse-grained schema 300, which associates multiple data instances to single identities or identifiers, the fine-grained schema 400 associates single data instances to single identities or identifiers. The fine-grained schema 400 comprises table 1 405, table 2 420, table 3 435, table 4 450, table 5 465, and table 6 480.

Table 1 405 comprises an identity 410 and a policy 415. Table 2 420 comprises an identity 425 and a metadatum 430. Table 3 435 comprises an identity 440 and an identifier 445. Table 4 450 comprises an identifier 455 and a location 460. Table 5 465 comprises an identifier 470 and a metadatum 475. Table 6 480 comprises an identifier 485 and a policy 490. The identities 410, 425, 440 are from the identities 200; the policies 415, 490 are from the policies 230; the metadata 430, 475 are from the metadata 220; the identifiers 445, 455, 470, 485 are from the identifiers 210; and the location 460 is from the locations 240.

As can be seen, table 1 405 associates the policy 415 with a single identity 410, table 2 420 associates the metadatum 430 with a single identity 425, table 3 435 associates the identifier 445 with a single identity 440, table 4 450 associates the location 460 with a single identifier 455, table 5 465 associates the metadatum 475 with a single identifier 470, and table 6 480 associates the policy 490 with a single identifier 485. The fine-grained schema 400 does not use set-valued entries. Though the fine-grained schema 400 shows specific numbers of data instances, the fine-grained schema 400 may have any number of such data instances.

The coarse-grained schema 300 and the fine-grained schema 400 may be implemented in any way that permits resolution of metadata, policies, and locations of an identity using any identifier associated with that identity. Similarly, the coarse-grained schema 300 and the fine-grained schema 400 may be implemented in any way that permits the metadata, policies, and locations to be applied to all identifiers associated with an identity. Thus, the coarse-grained schema 300 and the fine-grained schema 400 contrast other approaches that have only one-to-one relationships between identifiers on one hand and metadata, policies, and locations on another hand.

Figure 5:
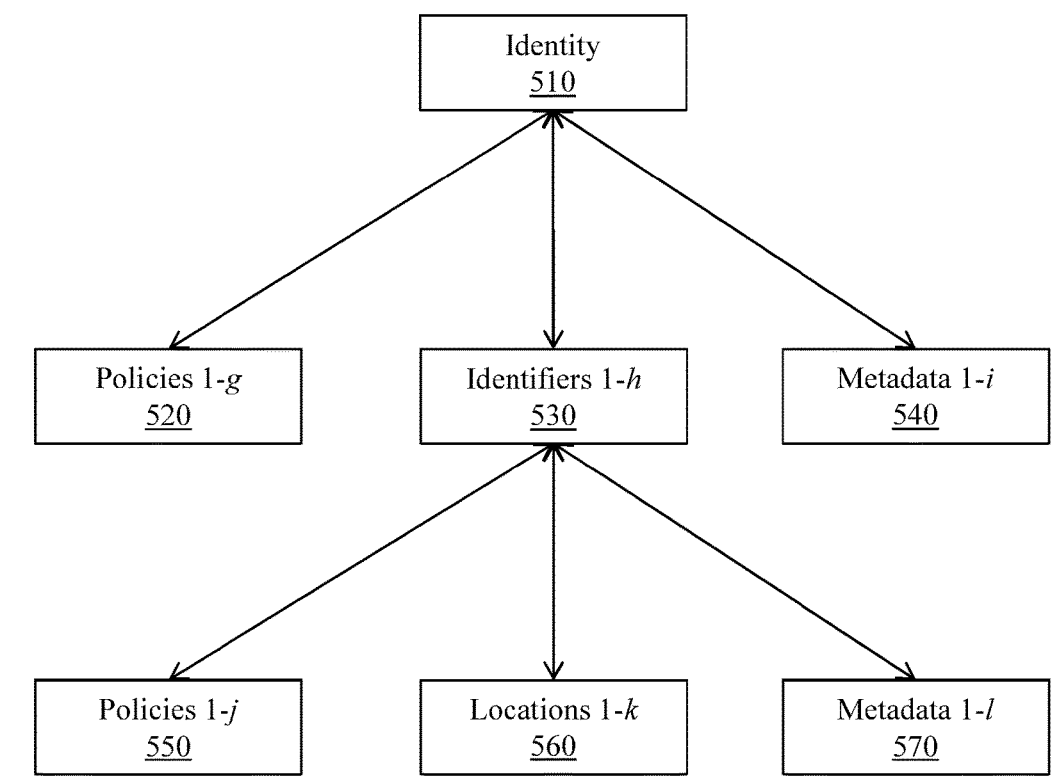
FIG. 5 is a relationship diagram according to an embodiment of the disclosure.

FIG. 5 is a relationship diagram 500 according to an embodiment of the disclosure. While the coarse-grained schema 300 in FIG. 3 and the fine-grained schema 400 in FIG. 4 demonstrate specific examples of how the service node 120 maps and stores data in the database 125, the relationship diagram 500 generalizes relationships among those data. Thus, the service node 120 may map and store data in the database 125 in any manner consistent with the relationship diagram 500.

The relationship diagram 500 comprises an identity 510, which is from the identities 200 and corresponds to one of the entities 145, 160. The identity 510 is associated with policies 1-*g* 520, which are from the policies 230; identifiers 1-*h* 530, which are from the identifiers 210; and metadata 1-*i* 540, which are from the metadata 220. The identifiers 530 are associated with policies 1-*j* 550, which are from the policies 230; locations 1-*k* 560, which are from the locations 240; and metadata 1-*l* 570, which are from the metadata 220. G, h, i, j, k, and l are any suitable integers and may be the same.

As can be seen, multiple policies 520, identifiers 530, and metadata 540 may be associated with a single identity 510 and thus a single entity 145 or 160. Similarly, multiple policies 550, locations 560, and metadata 570 may be associated with a single identifier. The locations 560 may be associated only with the identifiers 530 and not directly with the identity 510. However, a single policy may be associated with multiple identifiers of an identity; an identifier of an identity may be associated with only a subset of policies for the identity; a single policy may be associated with multiple identities and thus multiple entities 145, 160; a location may be the same for all identifiers of an identity; multiple locations may be associated with an identifier; or a single locator may be associated with multiple identifiers.

The relationship diagram 500 demonstrates an improved manageability of the network 100. For instance, the service node 120 need not update the policies 520 when it assigns a new identifier to the identity 510. In addition, the relationship diagram 500 supports the queries and operations described below, as well as additional queries and operations.

Figure 6:
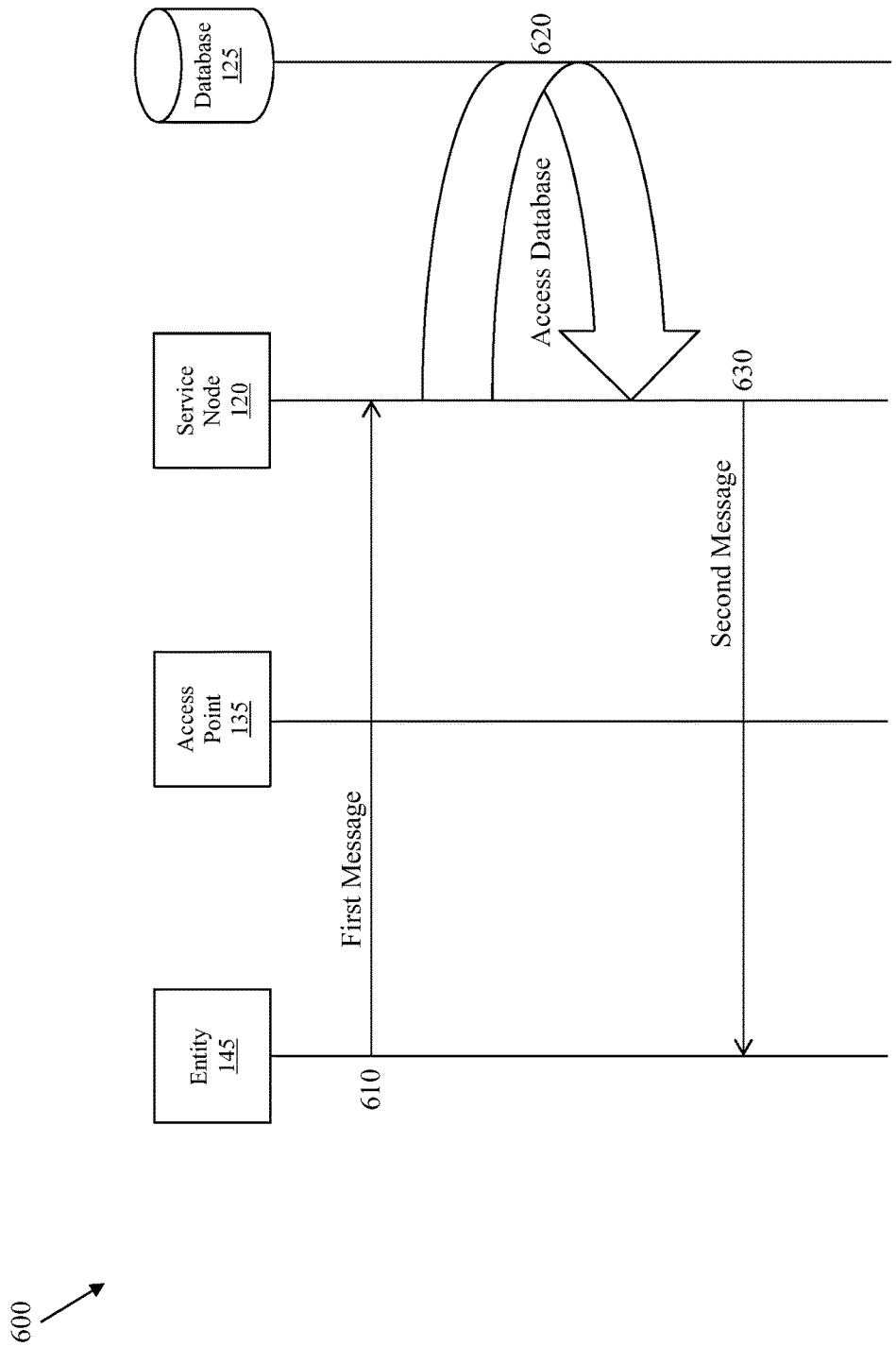
FIG. 6 is a message sequence diagram demonstrating queries and operations in the network in FIG. 1

FIG. 6 is a message sequence diagram 600 demonstrating queries and operations in the network 100 in FIG. 1. The message sequence diagram 600 implements at least the five examples of queries and operations given below. At step 610, the first entity 145 transmits a first message through the access point 135 and to the service node 120. The first message is a message to authenticate an identity or an identifier of the first entity 145; a message to update metadata, a policy, or a location associated with an identity or an identifier; a message to resolve metadata, a policy, or a location of an identity or an identifier; or another suitable message. At step 620, the service node 120 accesses the database 125. To do so, the service node 120 may authorize the entity 145 to confirm that the service node 120 may access the database 125 on behalf of the entity 145. For instance, if the first message requests data associated with the entity 160, then the service node 120 may authorize the entity 145 to confirm that the service node 120 may provide the data to the entity 145. Such authorization may depend on a policy associated with the entity 160. Finally, at step 630, the service node 120 transmits a second message through the access point 135 and to the entity 145. The service node 120 does so in response to the first message.

As a first example, at step 610, the first message comprises an identifier and requests policies and metadata associated with the identifier. At step 620, the service node 120 accesses the database 125 to select the identifier from the identifiers 530, determine the policies 550 and the metadata 570 associated with the identifier, and retrieve the policies 550 and the metadata 570. At step 630, the second message comprises the policies 550 and the metadata 570. The second message may not reveal the identity 510. Looking at the relationship diagram 500 in FIG. 5, it can be seen that the first example demonstrates a direct query because there are arrows directly connecting the requested policies 550 and metadata 570 to the provided identifier 530. The relationship diagram 500 supports other direct queries such as for requested locations 560 of provided identifiers 530 and for requested policies 520, identifiers 530, and metadata 540 of a provided identity 510.

As a second example, at step 610, the first message comprises an identifier and requests policies and metadata associated with the identifier's identity. At step 620, the service node 120 accesses the database 125 to select the identifier from the identifiers 530, determine the identity 510 associated with the identifier, determine the policies 520 and the metadata 540 associated with the identity 510, and retrieve the policies 520 and the metadata 540. At step 630, the second message comprises the policies 520 and the metadata 540. The second message may not reveal the identity 510. Looking at the relationship diagram 500 in FIG. 5, it can be seen that the second example demonstrates an indirect query because there are no arrows directly connected the requested policies 520 and metadata 540 to the provided identifier 530. Rather, there are arrows indirectly connecting the requested policies 520 and metadata 540 to the provided identifier 530 through the identity 510. The relationship diagram 500 supports other indirect queries such as for requested identifiers 530 and metadata 540 of provided policies 520 and requested policies 520 and identifiers 530 of provided metadata 540.

As a third example, at step 610, the first message comprises a first identifier and requests a second identifier associated with the first identifier. The first identifier may be an ephemeral identifier, and the second identifier may be a designated identifier or may be another identifier that a policy in the policies 520 permits the entity 145 to receive. At step 620, the service node 120 accesses the database 125 to select the first identifier from the identifiers 530, determine that the identity 510 is associated with the identifier, and retrieve from the identifiers 530 the second identifier associated with the identity 510. The identity 510 is associated with the entity 160. At step 630, the second message comprises the second identifier.

As a fourth example, at step 610, the first message comprises an identifier associated with the entity 160 and requests metadata associated with the identifier and the identifier's identity. At step 620, the service node 120 accesses the database 125 to select the identifier from the identifiers 530, determine the metadata 570 associated with the identifier, and retrieve the metadata 570. In addition, the service node 120 accesses the database 125 to determine the identity 510 associated with the identifier, determine the metadata 540 associated with the identity 510, and retrieve the metadata 540. The metadata 570 associated with the identifier may be an access point where the identifier was last registered. The metadata 540 associated with the identity 510, and thus the entity 160, may be a type of the entity 160 such as a mobile phone or an indication of whether the entity 160 has been a policy offender. The service node 120 then merges the metadata 570 and the metadata 540 to create merged metadata. At step 630, the second message comprises the merged metadata. The fourth example demonstrates a merge operation. The relationship diagram 500 supports other merge operations such as merging of the policies 520 with the policies 550.

As a fifth example, at step 610, the first message comprises an identifier and requests data associated with the identifier. The data may be policies, locations, or metadata. At step 620, the service node 120 accesses the database 125 to select the identifier from the identifiers 530, determine that the identity 510 is associated with the identifier, and retrieve from the policies 520 a policy associated with the identity 510 and indicating that the entity 145 may not receive data associated with the identity 510. The identity 510 is associated with the entity 160. At step 630, the second message indicates that the entity 145 may not receive data associated with the identifier.

As a sixth example, the entities 145, 160 register with the service node 120. As part of their respective registration processes, as shown in Table 1, the entity 145 registers a first identity with a first identifier and a second identifier, and the entity 160 registers a second identity, a third identifier, a policy, and a location.

TABLE 1

| Registered Data | |
|---|---|
| Entity 145: | Entity 160: |
| first identity | second identity |
| first identifier | third identifier |
| second identifier | policy |
|  | location |

The policy indicates that the first identifier may receive data associated with the second identity, but that the second identifier may not receive data associated with the second identity. The data may be the location. In that case, when using the second identifier, the entity 145 may not obtain the location of the entity 160.

As a first embodiment of the sixth example, at step 610, the first message comprises the first identifier and requests the location associated with the third identifier. At step 620, the service node 120 accesses the database 125 to select the third identifier from the identifiers 530; determine that the second identity, the identity 510, is associated with the third identifier; retrieve from the policies 520 the policy indicating that the first identifier may receive the location associated with the third identifier; and retrieve the location from the locations 560. At step 630, the second message comprises the location.

As a second embodiment of the sixth example, at step 610, the first message comprises the second identifier and requests the location associated with the third identifier. At step 620, the service node 120 accesses the database 125 to select the third identifier from the identifiers 530; determine that the second identity, the identity 510, is associated with the third identifier; and retrieve from the policies 520 the policy indicating that the second identifier may not receive the location associated with the third identifier. Because the policy indicates that the second identifier may not receive the location associated with the third identifier, the service node 120 does not retrieve the location from the locations 560. At step 630, the second message indicates that the second identifier may not receive the location associated with the third identifier or the second identity.

As a seventh example, the entities 145, 160 register with the service node 120 as shown in Table 1. The policy indicates that the first identifier or any identifier associated with an identity of the first identifier, in this case the first identity, may not receive data associated with the second identity. The policy is silent with respect to the second identifier and may be so because the first identifier is the only published identifier associated with the first identity.

The data may be the location. At step 610, the first message comprises the second identifier and requests the location associated with the third identifier. At step 620, the service node 120 accesses the database 125 to select the third identifier from the identifiers 530; determine that the second identity, the identity 510, is associated with the third identifier; retrieve from the policies 520 the policy indicating that any identifier associated with an identity of the first identifier may not receive data associated with the second identity; determine that the second identifier is associated with the first identity; and determine that the second identifier therefore may not receive the location associated with the third identifier. Because the policy may not be able to explicitly identify the first identity, which is not known to the entity 160 when the entity 160 registers the policy, the ability of the service node 120 to associate the second identifier with the first identity permits honoring of the policy. At step 630, the second message indicates that the second identifier or the first identity may not receive the location associated with the third identifier or the second identity.

As an eighth example, the entities 145, 160 register with the service node 120 as shown in Table 1. The policy indicates that the first identifier may not receive data associated with the second identity. The policy is silent with respect to the second identifier and may be so because the first identifier is the only published identifier associated with the first identity. The data may be the location. At step 610, the first message comprises the second identifier and requests the location associated with the third identifier. At step 620, the service node 120 accesses the database 125 to select the third identifier from the identifiers 530; determine that the second identity, the identity 510, is associated with the third identifier; retrieve from the policies 520 the policy indicating the first identifier may not receive data associated with the second identity; determine that the second identifier is associated with the second identity and thus the first identifier; extend the policy to the second identifier; and determine that the second identifier therefore may not receive the location associated with the third identifier. Because the policy may not be able to explicitly identify the first identity, which is not known to the entity 160 when the entity 160 registers the policy, the ability of the service node 120 to associate the second identifier with the first identifier permits honoring of the policy. At step 630, the second message indicates that the second identifier or the first identity may not receive the location associated with the third identifier or the second identity.

As a ninth example, the service node 120 determines whether multiple identifiers 530 belong to the same identity 510. For instance, the service node 120 receives a first identifier 530 from a first message, receives a second identifier 530 from a second message, and accesses the database 125 to determine whether both the first identifier 530 and the second identifier 530 belong to the same identity 510. If so, then the service node 120 performs a first action. If not, then the service node 120 performs a second action.

Figure 7:
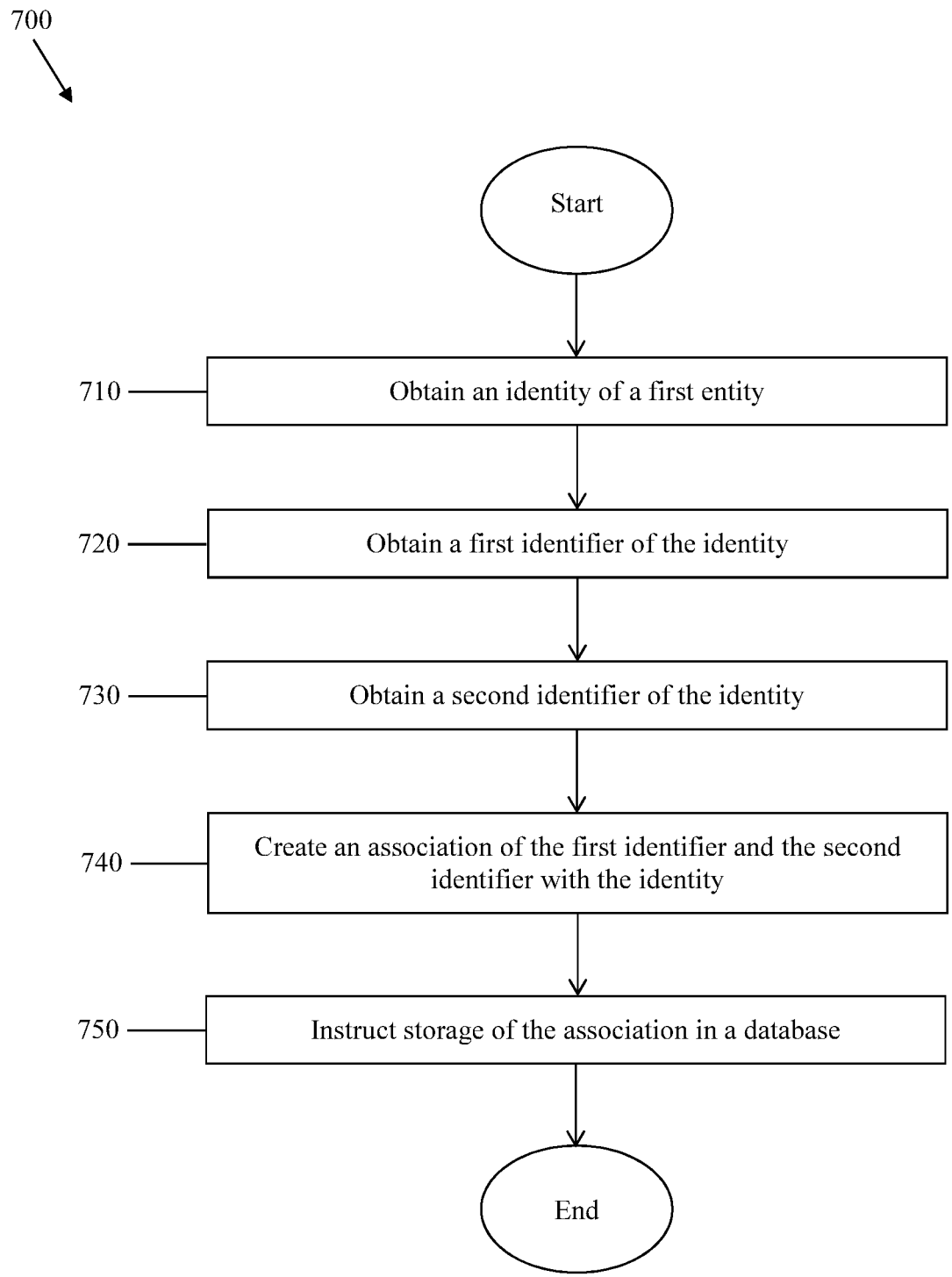
FIG. 7 is a flowchart illustrating a method of associating identifiers with an identity according to an embodiment of the disclosure.

FIG. 7 is a flowchart illustrating a method 700 of associating identifiers with an identity according to an embodiment of the disclosure. The service node 120 may implement the method 700. At step 710, an identity of a first entity is obtained. For instance, the service node 120 obtains the identity of the entity 145 when the entity 145 registers or authenticates with the service node 120. At step 720, a first identifier of the identity is obtained. At step 730, a second identifier of the identity is obtained. For instance, the service node 120 assigns the first identifier and the second identifier.

At step 740, an association of the first identifier and the second identifier with the identity is created. For instance, the service node 120 associates the first identifier and the second identifier with the identity as shown by table 3 350 in the coarse-grained schema 300 in FIG. 3 or as shown by two instances of table 3 435 in the fine-grained schema 400 in FIG. 4. Finally, at step 750, storage of the association in a database is instructed. For instance, the service node 120 instructs storage of the association in the database 125.

Figure 8:
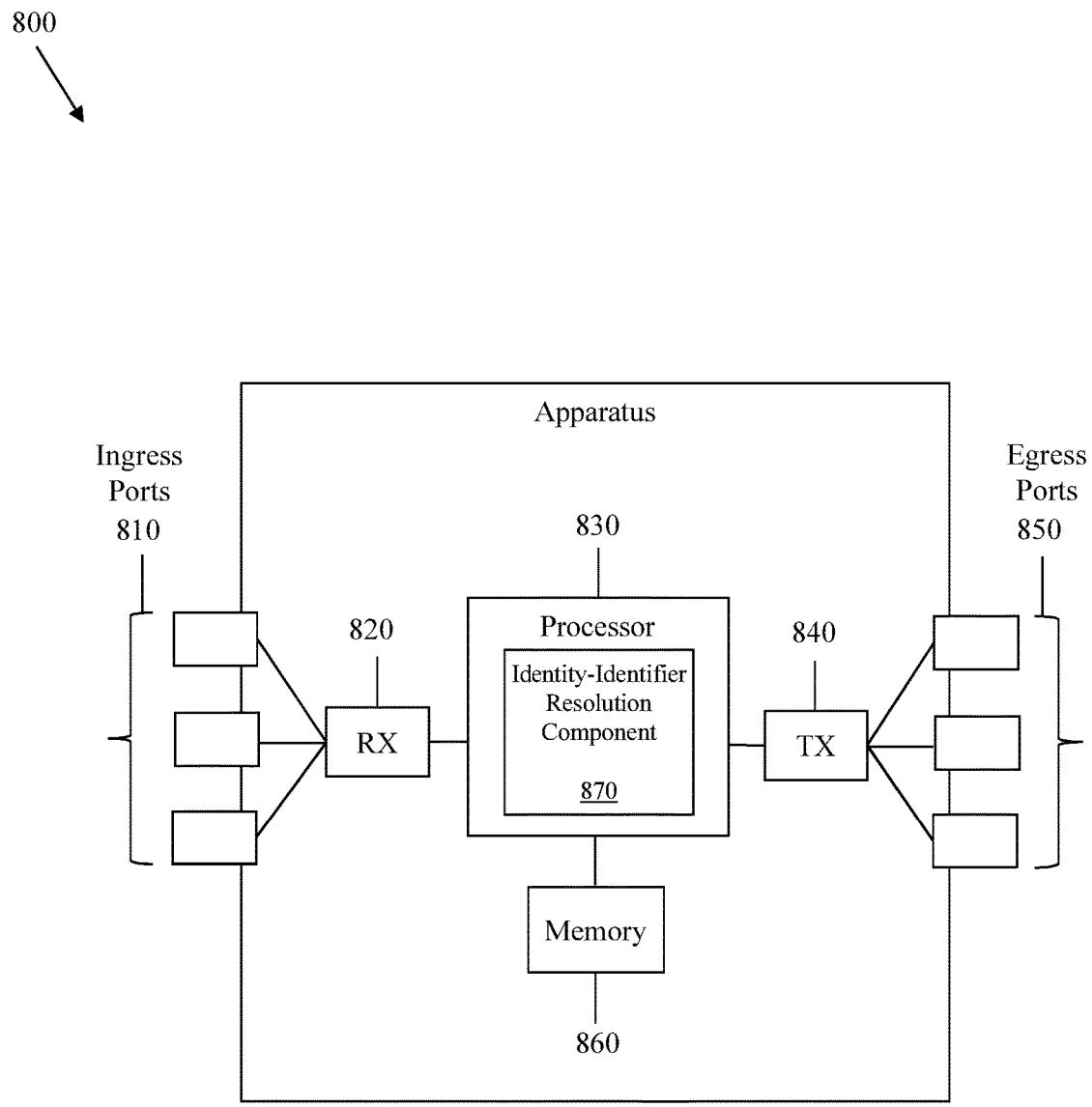
FIG. 8 is a schematic diagram of an apparatus according to an embodiment of the disclosure.

FIG. 8 is a schematic diagram of an apparatus 800 according to an embodiment of the disclosure. The apparatus 800 may implement the disclosed embodiments. The apparatus 800 comprises ingress ports 810 and an RX 820 for receiving data; a processor, logic unit, baseband unit, or CPU 830 to process the data; a TX 840 and egress ports 850 for transmitting the data; and a memory 860 for storing the data. The apparatus 800 may also comprise OE components, EO components, or RF components coupled to the ingress ports 810, the RX 820, the TX 840, and the egress ports 850 for ingress or egress of optical, electrical signals, or RF signals.

The processor 830 is any combination of hardware, middleware, firmware, or software. The processor 830 comprises any combination of one or more CPU chips, cores, FPGAs, ASICs, or DSPs. The processor 830 communicates with the ingress ports 810, RX 820, TX 840, egress ports 850, and memory 860. The processor 830 comprises an identity-identifier resolution component 870, which implements the disclosed embodiments. The inclusion of the identity-identifier resolution component 870 therefore provides a substantial improvement to the functionality of the apparatus 800 and effects a transformation of the apparatus 800 to a different state. Alternatively, the memory 860 stores the identity-identifier resolution component 870 as instructions, and the processor 830 executes those instructions.

The memory 860 comprises any combination of disks, tape drives, or solid-state drives. The apparatus 800 may use the memory 860 as an over-flow data storage device to store programs when the apparatus 800 selects those programs for execution and to store instructions and data that the apparatus 800 reads during execution of those programs. The memory 860 may be volatile or non-volatile and may be any combination of ROM, RAM, TCAM, or SRAM.

An apparatus in an IP network, the apparatus comprises: a receiving element configured to: obtain an identity of a first entity, obtain a first identifier of the identity, and obtain a second identifier of the identity; and a processing element coupled to the receiving element and configured to: create an association of the first identifier and the second identifier with the identity, and instruct storage of the association in a database.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus in an Internet Protocol (IP) network, the apparatus comprising:
a receiver configured to:
obtain an identity of a first entity, wherein the identity is a unique identification of the first entity at a given time,
obtain a first identifier of the identity, wherein the first identifier is a publicly known designated identifier, and
obtain a second identifier of the identity, wherein the second identifier is an ephemeral identifier used for anonymity or obfuscation of the identity, and wherein the first identifier and the second identifier are different identifications of the identity; and
a processor coupled to the receiver and configured to:
create an association of the first identifier and the second identifier with the identity, and
instruct storage of the association in a database.

2. The apparatus of claim 1, wherein the first identifier and the second identifier are any combination of IP addresses, cryptographic hashes of IP addresses, Locator/Identifier Separation Protocol (LISP) endpoint identifiers (EIDs), or Host Identity Protocol (HIP) host identity tags (HITs).

3. The apparatus of claim 1, wherein the apparatus is a service node.

4. The apparatus of claim 1, wherein the receiver is further configured to receive a first message from a second entity, and wherein the first message comprises the first identifier and requests data associated with the identity.

5. The apparatus of claim 4, wherein, in response to the first message, the processor is further configured to access the database to determine that the identity is associated with the first identifier.

6. The apparatus of claim 5, wherein, in response to the first message, the processor is further configured to retrieve the data when a policy permits provision of the data to the second entity.

7. The apparatus of claim 6, wherein, in response to the first message, the processor is further configured to generate a second message comprising the data.

8. The apparatus of claim 7, further comprising a transmitter coupled to the processor and configured to transmit the second message to the second entity.

9. A method implemented in an Internet Protocol (IP) network, the method comprising:
obtaining an identity of a first entity, wherein the identity is a unique identification of the first entity at a given time;
obtaining a first identifier of the identity, wherein the first identifier is a publicly known designated identifier;
obtaining a second identifier of the identity, wherein the second identifier is an ephemeral identifier used for anonymity or obfuscation of the identity, and wherein the first identifier and the second identifier are different identifications of the identity;
creating an association of the first identifier and the second identifier with the identity; and
instructing storage of the association in a database.

10. The method of claim 9, wherein the first identifier and the second identifier are any combination of IP addresses, cryptographic hashes of IP addresses, Locator/Identifier Separation Protocol (LISP) endpoint identifiers (EIDs), or Host Identity Protocol (HIP) host identity tags (HITs).

11. The method of claim 9, further comprising receiving a first message from a second entity, wherein the first message comprises the first identifier and requests data associated with the identity.

12. The method of claim 11, further comprising:
accessing, in response to the first message, the database to determine that the identity is associated with the first identifier;
retrieving the data when a policy permits provision of the data to the second entity;
generating a second message comprising the data; and
transmitting the second message to the second entity.

13. A first entity in an Internet Protocol (IP) network, the first entity comprising:
a processor configured to generate a first message comprising a first identifier and requesting data associated with an identity of the first identifier, wherein the identity is a unique identification of a second entity at a given time, and wherein the first identifier is an identification of the identity;
a transmitter coupled to the processor and configured to transmit the first message to a service node; and
a receiver coupled to the processor and configured to receive a second message from the service node and in response to the first message,
wherein the second message comprises the data when the first message further comprises a second identifier of the first entity and when a policy of the identity indicates that the second identifier may receive the data.

14. The first entity of claim 13, wherein the data are metadata or a location.

15. The first entity of claim 13, wherein the data comprise all identifiers associated with the identity.

16. The first entity of claim 13, wherein the second message omits the data when the policy prohibits provision of the data to the first entity.

17. A method implemented by a first entity, the method comprising:
registering a first identity with a service node;
registering a first identifier with the service node;
transmitting to the service node a first message requesting a location associated with a second entity, wherein the second entity is associated with a policy; and
receiving, when the first message comprises a second identifier of the first identity and when the policy indicates that the first identifier or the first identity may not receive the location, a third message indicating that the second identifier or the first identity may not receive the location.

18. The method of claim 17, further comprising receiving, when the first message comprises the first identifier and when the policy indicates that the first identifier may receive the location, a second message comprising the location.

* * * * *